United States Patent [19]

Shellaberger

[11] Patent Number: 5,836,823
[45] Date of Patent: Nov. 17, 1998

[54] WEBBED YOKE FOR UNIVERSAL JOINT

[75] Inventor: James C. Shellaberger, Elida, Ohio

[73] Assignee: Dana Corporation, Toledo, Ohio

[21] Appl. No.: 607,934

[22] Filed: Feb. 28, 1996

[51] Int. Cl.[6] ...................................................... F16D 3/40
[52] U.S. Cl. ........................... 464/134; 403/298; 464/162
[58] Field of Search .................................... 464/133, 134, 464/135, 136, 157, 162, 170, 172, 181; 403/298, 109, 7, 327

[56] References Cited

U.S. PATENT DOCUMENTS

| | | | |
|---|---|---|---|
| 4,192,153 | 3/1980 | Fisher . | |
| 4,431,334 | 2/1984 | Cleveland et al. ....................... | 464/134 |
| 4,472,158 | 9/1984 | Joyner ...................................... | 464/134 |
| 4,475,737 | 10/1984 | Cook, Jr. et al. ..................... | 464/462 X |
| 4,552,544 | 11/1985 | Beckman et al. ........................ | 464/162 |
| 4,583,960 | 4/1986 | Joyner ...................................... | 464/134 |
| 4,881,924 | 11/1989 | Gall .......................................... | 464/134 |
| 5,038,847 | 8/1991 | Donahue et al. . | |
| 5,078,533 | 1/1992 | Madonio et al. ......................... | 464/133 |
| 5,342,243 | 8/1994 | Seksaria et al. . | |
| 5,417,613 | 5/1995 | Aiken . | |
| 5,562,546 | 10/1996 | Koslowski et al. ...................... | 464/162 |

FOREIGN PATENT DOCUMENTS 2197051  5/1988  United Kingdom .

OTHER PUBLICATIONS

Dana Drawing No. C6-3-129 dated Jan. 13, 1982.

*Primary Examiner*—Eileen A. Dunn
*Attorney, Agent, or Firm*—MacMillan, Sobanski & Todd

[57] ABSTRACT

A slip yoke includes a generally cylindrical body rotatable about an axis. The slip yoke further includes an axially extending spline for engagement with a mating spline of an associated apparatus. Two generally axially extending arms are symmetrically positioned about the axis. Each of the arms has a generally cylindrical opening formed therethrough transversely to the axis. The openings are aligned with one another. Each of the arms includes an outer surface having recessed areas formed therein. The recessed areas define webs extending between the cylindrical body and the opening.

13 Claims, 5 Drawing Sheets

WEBBED YOKE FOR UNIVERSAL JOINT

BACKGROUND OF THE INVENTION

This invention relates in general to universal joints, and in particular to an improved structure for a heavy duty slip yoke adapted for use with a universal joint in a vehicle drive shaft assembly.

In many different types of vehicles, a drive shaft assembly is used to transmit rotational power from a source, such as an engine, to a driven component, such as a pair of wheels. One type of drive shaft assembly includes a hollow cylindrical drive shaft tube connected at one end to the output shaft of a vehicle transmission, and at the other end to the input shaft of an axle assembly. This assembly provides a rotatable driving connection between the vehicle transmission and the axle assembly for rotatably driving the vehicle wheels.

The output shaft of the vehicle transmission and the input shaft of the axle assembly often are adapted to rotate about non-aligned axes of rotation. Universal joints are provided in the drive shaft assembly to accommodate this non-coaxial relationship. A first universal joint connects the drive shaft tube to the output shaft of the vehicle transmission, and a second universal joint connects the drive shaft tube to the input shaft of the axle assembly.

Each of the universal joints includes an end yoke connected to the end of the drive shaft tube. In a preferred drive shaft assembly, one end yoke is a slip yoke that is rotatably connected to the drive shaft tube but can slide axially relative thereto. For example, the slip yoke may have a splined inner surface that slidably receives the splined outer surface of a shaft connected to the drive shaft tube. The slip yoke provides flexibility in the length of the drive shaft assembly to accommodate for rough driving conditions.

An end yoke usually includes a generally cylindrical body and a pair of spaced-apart arms extending therefrom. The body is connected to the end of the drive shaft tube. The arms have a pair of coaxial openings extending therethrough. The universal joint includes a cross member having four outwardly extending trunnions. A bearing cup is rotatably mounted on the end of each of the trunnions. One pair of opposed bearing cups is received in the openings through the arms of the end yoke for connection thereto. The other pair of opposed bearing cups is connected to a yoke secured to the output shaft of the vehicle transmission or the input shaft of the axle assembly.

During operation of the vehicle, an end yoke is subjected to heavy torque loads from rotation of the drive shaft assembly. These heavy loads tend to distort and deflect the arms of the end yoke. Consequently, the end yoke is constructed with sufficient strength to resist such distortion and deflection. In the past, the end yoke has been constructed with relatively massive arms to impart the necessary strength. Unfortunately, the massiveness of the arms adds to the weight and material cost of the end yoke. Thus, it would be desirable to provide an end yoke that is lighter in weight, but that still has sufficient strength to resist distortion and deflection of the arms.

An end yoke for a vehicle drive shaft assembly is usually formed by casting the yoke from a metallic material such as steel or iron. The conventional casting method produces a yoke having a hard outer skin. It is often desirable to balance the drive shaft assembly by welding weights to the outer surface of the end yoke. Unfortunately, the hard outer skin of a conventional casting is not a suitable surface for welding balance weights. Therefore, the outer surface of the conventional casting is usually machined to provide a suitable welding surface. This operation increases the cost and complexity of the manufacturing process. Thus, it would also be desirable to provide a casting method that forms an end yoke having an outer surface that is suitable for welding balance weights.

SUMMARY OF THE INVENTION

This invention relates to a heavy duty slip yoke adapted for use with a universal joint in a vehicle drive shaft assembly. The slip yoke includes a generally cylindrical body rotatable about an axis. The slip yoke further includes an axially extending spline for engagement with a mating spline of an associated apparatus. Two generally axially extending arms are symmetrically positioned about the axis. Each of the arms has a generally cylindrical opening formed therethrough transversely to the axis. The openings are aligned with one another. Each of the arms includes an outer surface having recessed areas formed therein. The recessed areas define webs extending between the cylindrical body and the opening. Preferably, each of the arms has two recessed areas that define a middle web and a pair of outer webs. Preferably, the webs are tapered, and the middle web is wider in the direction of the opening and narrower in the direction of the cylindrical body, while the outer webs are wider in the direction of the cylindrical body and narrower in the direction of the opening.

The slip yoke is preferably formed by a lost foam casting method. In this method, an evaporable foam pattern is formed having a configuration conforming to the slip yoke. The pattern is positioned in a mold, and a flowable finely divided material is introduced around the pattern. A molten metal is fed into contact with the pattern to vaporize the pattern. The vapor passes into the interstices of the flowable material. The molten metal occupies the void created by vaporization of the pattern to provide a metal slip yoke.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
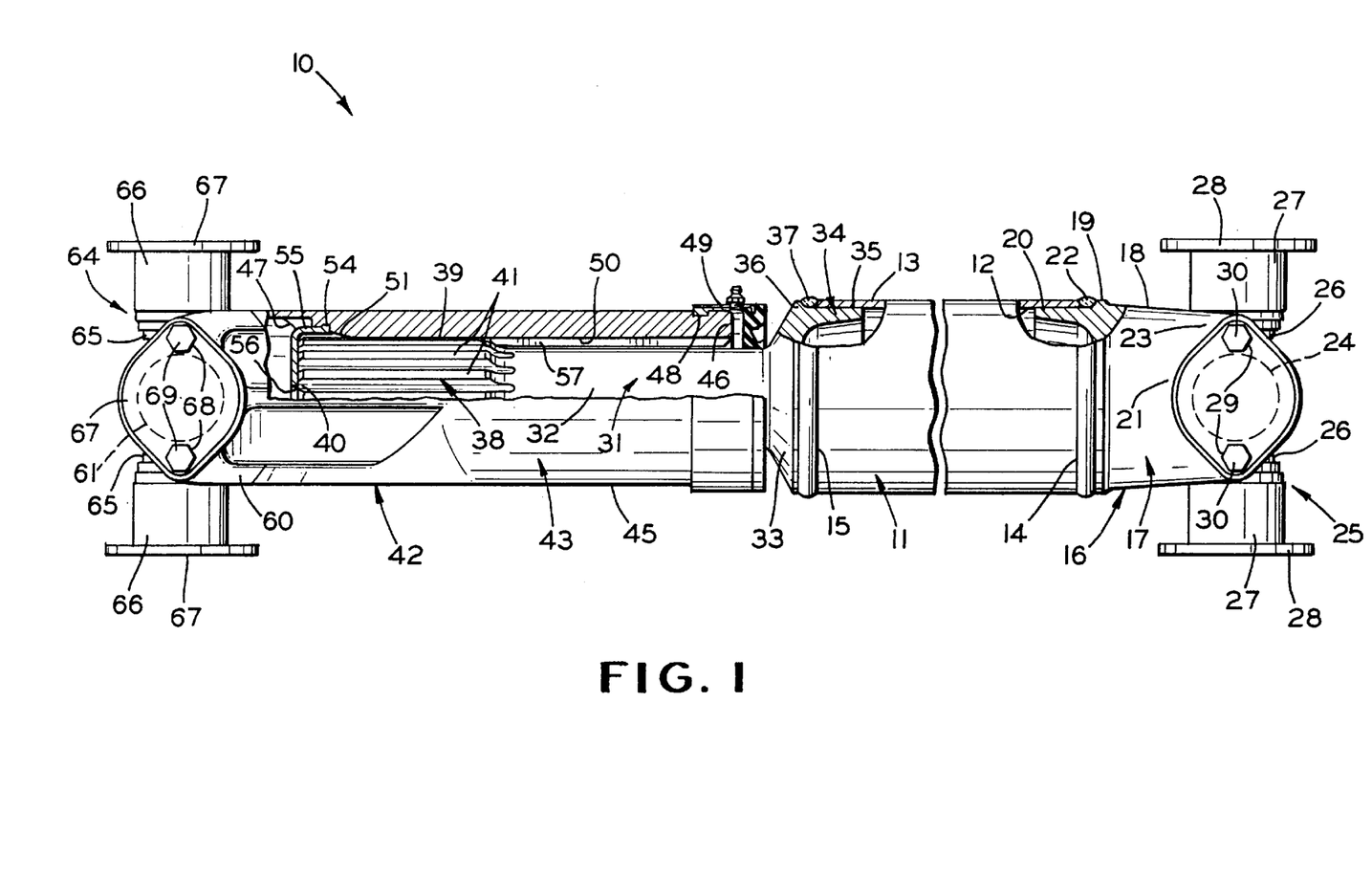
FIG. 1 is an elevational view, partly in cross-section, of a drive shaft assembly for a vehicle in accordance with this invention.

Referring now to the drawings, there is illustrated in FIG. 1 a vehicular drive shaft assembly, indicated generally at 10, in accordance with this invention. The drive shaft assembly 10 can be used, for example, to transmit rotational power from the transmission of an engine to the differential of an axle assembly for rotatably driving the vehicle wheels.

The drive shaft assembly 10 includes a hollow cylindrical drive shaft tube 11. The drive shaft tube 11 has an inner cylindrical surface 12 and an outer cylindrical surface 13. It has opposing first end 14 and second end 15. The drive shaft tube 11 is rotatable about its longitudinal axis. It is preferably formed from a metallic or composite material.

A yoke such as a ball yoke 16 is secured to the first end 14 of the drive shaft tube 11 for rotation therewith. The ball yoke 16 is preferably formed from a metallic material. It includes a generally cylindrical body 17 having an outer cylindrical surface 18. A generally annular protrusion 19 is formed on the outer cylindrical surface 18. The body 17 includes a shaft end 20 and a yoke end 21. The shaft end 20 of the body 17 is telescopically received within the first end 14 of the drive shaft tube 11, until the first end 14 abuts the protrusion 19. The diameter of the outer cylindrical surface 18 of the body 17 is slightly greater than the diameter of the inner cylindrical surface 12 of the drive shaft tube 11, so that the body 17 engages the drive shaft tube 11 in a light press fit relationship. The body 17 of the ball yoke 16 is secured to the drive shaft tube 11 by a weld 22. A pair of spaced-apart arms 23 (one of which is shown) extends from the yoke end 21 of the body 17. Each of the arms 23 has a generally cylindrical opening 24 formed therethrough. The openings 24 of the arms 23 are coaxial with one another. A machined outer surface (not shown) is formed about each of the openings. A pair of threaded apertures is formed in the outer surface on opposing sides of the opening.

A cross member 25 is connected to the ball yoke 16. The cross member 25 has a central body portion with four cylindrical trunnions 26 extending outwardly therefrom (two of which are shown). The trunnions 26 are oriented in a single plane and extend at right angles relative to one another. A hollow, cylindrical bearing cup 27 is rotatably mounted on the end of each of the trunnions 26. A bearing plate 28 is welded to the end of each of the bearing cups 27. A pair of opposed apertures 29 is formed through each of the bearing plates 28. One pair of opposed bearing cups 27 is received in the openings 24 through the arms 23 of the ball yoke 16 for connection thereto. The apertures 29 are aligned with the threaded apertures in the arms 23 of the ball yoke 16. Threaded fasteners 30 are inserted into the apertures 29 and threaded apertures to secure each bearing cup 27 to the respective arm 23 of the ball yoke 16. In operation, the other pair of opposed bearing cups 27 is connected to a yoke (not shown) secured to the input shaft of the differential of the axle assembly. Thus, a universal joint is provided between the drive shaft tube 11 and the axle assembly for rotatably driving the vehicle wheels.

A stub shaft 31 is secured to the second end 15 of the drive shaft tube 11 for rotation therewith. The stub shaft 31 is preferably formed from a metallic material. It includes a generally cylindrical body 32. The stub shaft 31 widens at a shoulder 33 to form an enlarged end portion 34. The enlarged end portion 34 has a diameter larger than that of the body 32. It is generally cylindrical in shape and includes an outer cylindrical surface 35. A generally annular protrusion 36 is formed on the outer cylindrical surface 35. The enlarged end portion 34 of the stub shaft 31 is telescopically received within the second end 15 of the drive shaft tube 11, until the second end 15 abuts the protrusion 36. The diameter of the outer cylindrical surface 35 of the enlarged end portion 34 is slightly greater than the diameter of the inner cylindrical surface 12 of the drive shaft tube 11, so that the enlarged end portion 34 engages the drive shaft tube 11 in a light press fit relationship. The enlarged end portion 34 of the stub shaft 31 is secured to the second end 15 of the drive shaft tube 11 by a weld 37.

The stub shaft 31 further includes a splined end portion 38. The splined end portion 38 is generally cylindrical in shape. It has a diameter somewhat larger than the diameter of the body 32 of the stub shaft 31, but smaller than the diameter of the enlarged end portion 34. The splined end portion 38 includes an outer cylindrical surface 39 and an end surface 40. The outer cylindrical surface 39 has a plurality of spline teeth 41 formed thereon. The spline teeth 41 extend longitudinally along the outer cylindrical surface 39 and extend outwardly therefrom.

Referring now to FIGS. 1 through 4, a slip yoke in accordance with this invention is indicated generally at 42. The slip yoke 42 is preferably formed from a metallic material such as steel. It includes a hollow, generally cylindrical body 43 that is rotatable about its longitudinal axis 44. The body 43 includes an outer cylindrical surface 45, a shaft end 46 and a yoke end 47. A generally annular groove 48 is formed in the outer cylindrical surface 45 near the shaft end 46 of the body 43. A seal 49, which will be described in more detail below, is positioned in the groove 48. A generally cylindrical bore 50 extends axially through the body 43 from the shaft end 46 toward the yoke end 47. The bore 50 defines an inner cylindrical surface of the body 43. A counterbore 51 extends axially from the yoke end 47 of the body 43 and is connected to the bore 50. The counterbore 51 is generally frusto-conical in shape. It includes a smaller diameter end 52 that is connected to the bore 50. The counterbore 51 widens to a larger diameter end 53 at the yoke end 47 of the body 43. The yoke end 47 of the body 43 further includes a generally annular groove 54 formed adjacent to the larger diameter end 53 of the counterbore 51. A dust cap 55, which will be described in more detail below, is positioned in the groove 54. The dust cap 55 includes an aperture 56 for venting air.

The bore 50 of the slip yoke 42 is splined. It has a plurality of spline teeth 57 formed thereon which extend longitudinally along the bore 50 and extend inwardly therefrom. The spline teeth 57 extend the length of the bore 50. However, the spline teeth 57 do not extend onto the counterbore 51. Rather, the spline teeth 57 have tapered end portions 58 that terminate where the bore 50 meets the counterbore 51. Advantageously, this structure has been found to dramatically reduce the amount of tool wear during a broaching operation to form the spline teeth 57. The slip yoke 42 substantially obtains the benefits of a full splined bore but with reduced tool wear.

The splined end portion 38 of the stub shaft 31 has a diameter slightly smaller than the diameter of the bore 50 of the slip yoke 42. The splined end portion 38 is telescopically received within the bore 50. A chamfer 59 is provided between the bore 50 and the shaft end 46 of the slip yoke 42 to facilitate insertion of the stub shaft 31. The outwardly extending spline teeth 41 of the splined end portion 38 mate with the inwardly extending spline teeth 57 of the bore 50. Both sets of spline teeth 41 and 57 extend in the longitudinal direction. As a result, the splined end portion 38 can slide axially relative to the bore 50. As shown in FIG. 1, the splined end portion 38 can extend into the bore 50 until its end surface 40 is adjacent to the dust cap 55 and the shoulder 33 of the stub shaft 31 abuts the seal 49. The usual position of the splined end portion 38 is about one-half the distance along the length of the bore 50. While allowing axial movement, the mating spline teeth 41 and 57 prevent the splined end portion 38 of the stub shaft 31 from rotating relative to the bore 50 of the slip yoke 42. Thus, the slip yoke 42 is rotatably connected to the stub shaft 31.

The slip yoke 42 further includes a pair of opposed arms 60 extending generally axially from the body 43. The arms 60 are generally symmetrical and are radially spaced relative to one another. The slip yoke 42 including the body 43 and arms 60 is generally Y-shaped in form. Each of the arms 60 has a generally cylindrical opening 61 formed therethrough. The openings 61 of the arms 60 are coaxial with one another. A machined outer surface 62 is formed about each of the openings 61. A pair of threaded apertures 63 is formed in the outer surface 62 on opposing sides of the opening 61. The arms 60 will be described in more detail below.

A cross member 64 is connected to the slip yoke 42. The cross member 64 has a central body portion with four cylindrical trunnions 65 extending outwardly therefrom (two of which are shown). The trunnions 65 are oriented in a single plane and extend at right angles relative to one another. A hollow, cylindrical bearing cup 66 is rotatably mounted on the end of each of the trunnions 65. A bearing plate 67 is welded to the end of each of the bearing cups 66. A pair of opposed apertures 68 is formed through each of the bearing plates 67. One pair of opposed bearing cups 66 is received in the openings 61 through the arms 60 of the slip yoke 42 for connection thereto. The apertures 68 are aligned with the threaded apertures 63 in the arms 60 of the slip yoke 42. Threaded fasteners 69 are inserted into the apertures 63 and 68 to secure each bearing cup 66 to the respective arm 60 of the slip yoke 42. In operation, the other pair of opposed bearing cups 66 is connected to a yoke (not shown) secured to the output shaft of the transmission of the vehicle. Thus, a universal joint is provided between the transmission and the drive shaft tube 11 for transmitting rotational power from the engine to the drive shaft tube 11.

Referring now to FIGS. 2 through 7, the arms 60 of the slip yoke 42 will be described in more detail. Each arm 60 includes a shoulder portion 70 connected to the body 43 of the slip yoke 42. The shoulder portion 70 curves slightly outwardly from the body 43 of the slip yoke 42 relative to the longitudinal axis 44. Each arm 60 further includes an end portion 71 connected to the shoulder portion 70. The end portion 71 extends from the shoulder portion 70 generally parallel to the longitudinal axis 44. A generally cylindrical opening 61 is formed through the end portion 71 of each arm 60. Preferably, the end portion 71 extends from the shoulder portion 70 a distance equal to about twice the diameter of the opening 61.

Each arm 60 includes an inner surface 72. The inner surface 72 includes a slightly concave rounded portion 73 between the opening 61 and the counterbore 51. Each arm 60 also includes an outer surface 74. Further, each arm 60 includes a pair of side surfaces 75 between the inner surface 72 and the outer surface 74.

A pair of recessed areas 76 is formed in the outer surface 74 of each arm 60. The recessed areas 76 comprise a substantial portion of each arm 60, and thus provide a substantial reduction in the weight of the slip yoke 42. The recessed areas 76 are elongated and extend generally axially between the body 43 of the slip yoke 42 and the opening 61 of the arm 60. They are disposed in side by side relation with one another. Each of the recessed areas 76 is generally shaped as a parallelogram. One side of each recessed area 76 is disposed toward the opening 61 of the arm 60. The recessed areas 76 of one arm 60 are generally symmetrical with the recessed areas 76 of the other arm 60.

Each of the recessed areas 76 includes a generally flat portion 77 adjacent the body 43 of the slip yoke 42. The flat portion 77 is positioned in the shoulder portion 70 of the arm 60. The flat portion 77 extends generally coplanar with the body 43 while the shoulder portion 70 curves slightly outwardly from the body 43. As a result, the depth of the flat portion 77 gradually increases as the flat portion 77 extends from the body 43 toward the opening 61. The greatest depth of the flat portion 77 is in the general area where the shoulder portion 70 of the arm 60 connects to the end portion 71 of the arm 60.

Figure 5:
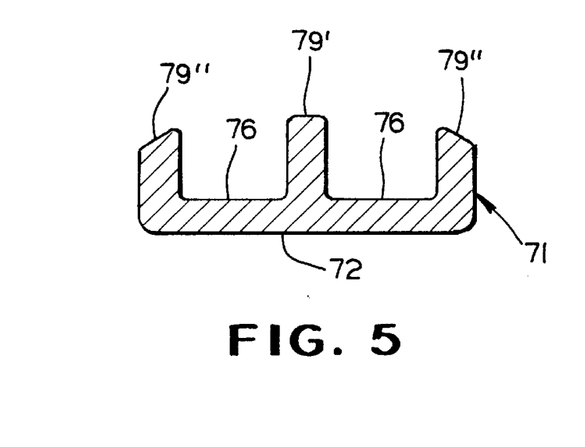
FIG. 5 is a sectional view of a portion of the slip yoke taken on line 5—5 of FIG. 4.
Figure 6:
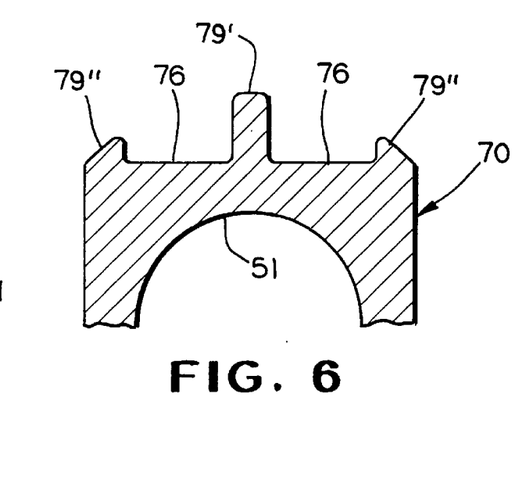
FIG. 6 is a sectional view of a portion of the slip yoke taken on line 6—6 of FIG. 4.
Figure 7:
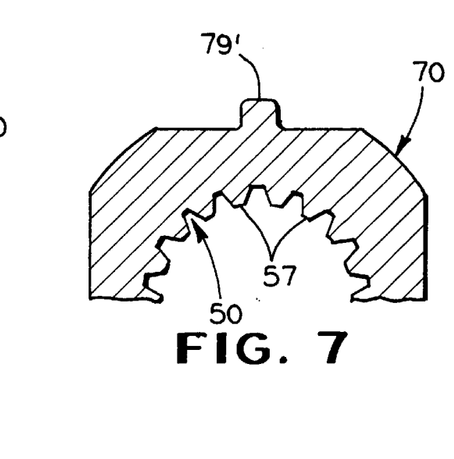
FIG. 7 is a sectional view of a portion of the slip yoke taken on line 7—7 of is FIG. 4.

Each of the recessed areas 76 further includes a slightly convex rounded portion 78 between the flat portion 77 and the opening 61. The depth of the rounded portion 78 gradually decreases as it extends between the flat portion 77 and the opening 61. However, the rounded portion 78 maintains a substantial depth adjacent the opening 61. The varying depth of the recessed areas 76 is best illustrated in FIGS. 5 through 7. Each of the slightly convex rounded portions 78 is disposed opposite the slightly concave rounded portion 73 of the inner surface 72 of the arm. The distance between the rounded portions 78 and the rounded portion 73 is small, so that the material in the arm 60 is thin in these areas.

The two recessed areas 76 of each arm 60 define three webs 79. The webs 79 are thin and elongated. They extend generally axially between the body 43 of the slip yoke 42 and the opening 61 of the arm 60. A middle web 79' is disposed between the two recessed areas 76. The middle web 79' is positioned generally centrally in the arm 60. A pair of outer webs 79" is disposed outside the two recessed areas 76. Each of the outer webs 79" is disposed between a recessed area 76 and a side surface 75 of the arm 60. The webs 79 extend generally parallel with one another. Each of the webs 79 is tapered, having a gradual decrease in width from one end to the other. The middle web 79' is slightly wider at the end portion 71 of the arm 60 and narrower at the shoulder portion 70 of the arm 60. Each of the outer webs 79" is slightly narrower at the end portion 71 of the arm 60 and wider at the shoulder portion 70 of the arm 60. The webs 79 extend along portions of both the shoulder portion 70 and end portion 71 of the arm 60. Because the end portion 71 is slightly angled relative to the shoulder portion 70, each web 79 includes a ridge 80 in the outer surface 74 between the shoulder portion 70 and the end portion 71. The height of different portions of the webs 79 is defined by the depth of the corresponding portions of the recessed areas 76.

The webs 79 and recessed areas 76 are shown in cross-section in FIGS. 5 through 7 taken through different portions of the arm 60 and body 43 of the slip yoke 42. FIG. 6 also shows the counterbore 51, and FIG. 7 also shows the bore 50 with spline teeth 57.

Figure 2:
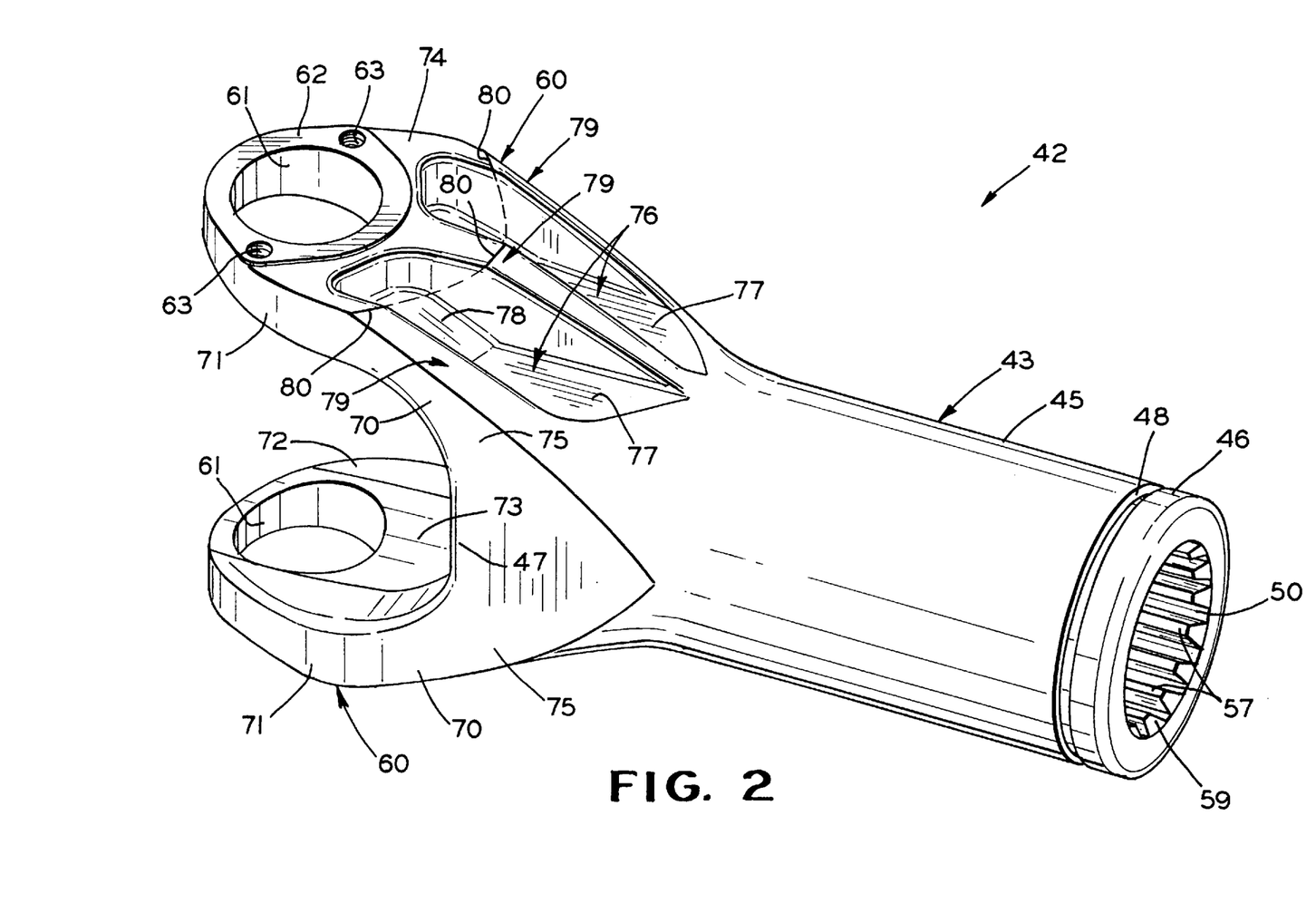
FIG. 2 is a perspective view of a slip yoke for a universal joint in accordance with this invention.

While the recesses 76 allow the arms 60 to be significantly lighter in weight, the structures of the arms 60 provide sufficient strength to resist distortion and deflection during operation of the vehicle. As shown in FIG. 2 with the help of the dotted line, the outer surface 74 of the end portion 71 of each arm 60 is generally elliptical in shape. Moreover, as discussed above, the inner and outer surfaces 72 and 73 of each arm 60 include opposing rounded portions 74 and 76, respectively. These shapes have been found to impart strength to the arms 60. Additional strength is built into the arms 60 by the shape of the webs. As discussed above, the first web 79' is slightly wider at the end portion 71 and narrower at the shoulder portion 70, while the second and third webs 79" are slightly narrower at the end portion 71 and wider at the shoulder portion 70. Another structural feature that imparts strength is the width W of the arms 60 shown in FIG. 4. Because of the shape of the webs 79, the full width W of the arms 60 is maintained at a greater distance along the length of the slip yoke 42 than in a conventional slip yoke.

Figure 3:
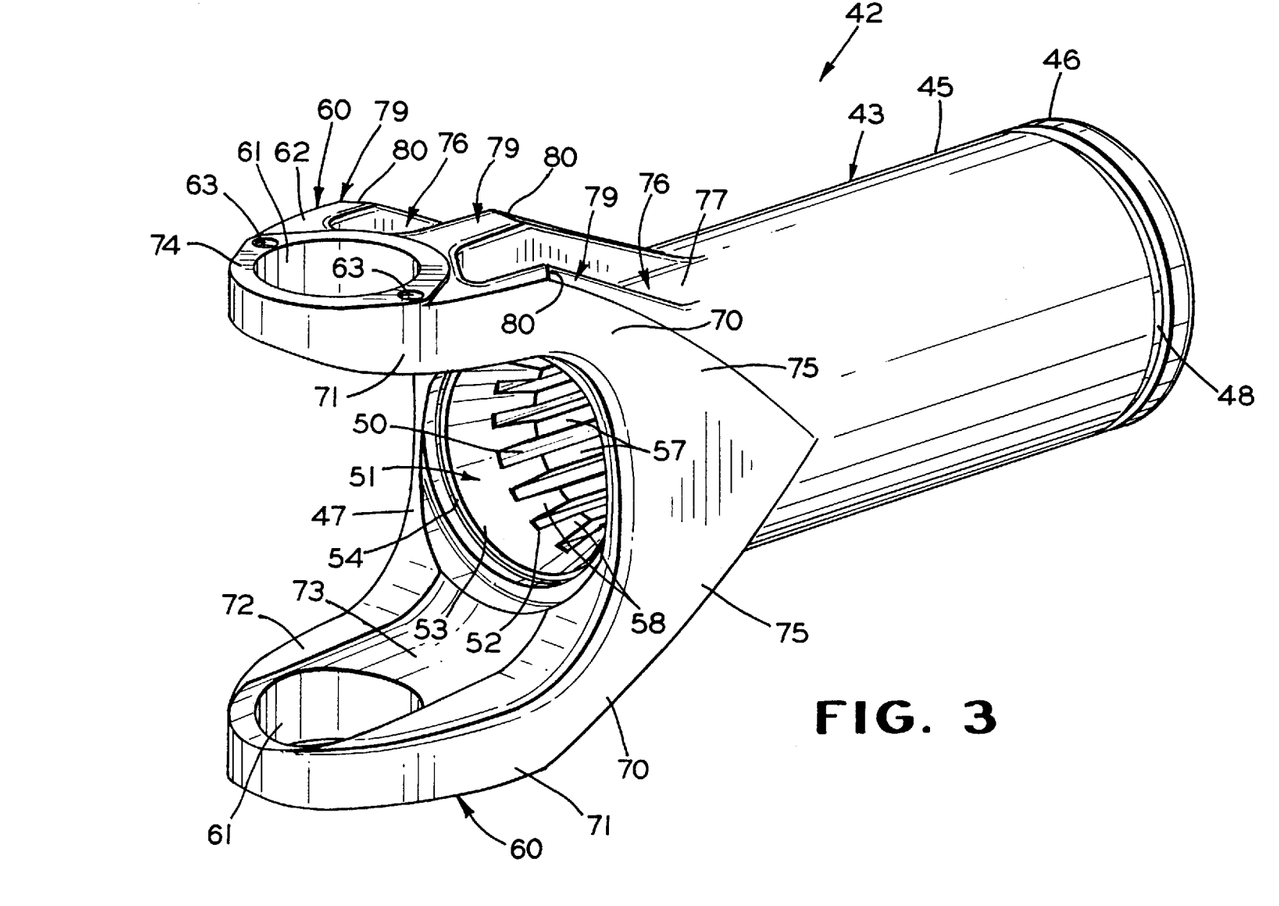
FIG. 3 is a perspective view of the slip yoke of FIG. 2 taken from another angle.

As illustrated in FIGS. 2 and 3, the side surfaces 75 of the arms 60 extend generally coplanar with the outer cylindrical surface 45 of the body 43 of the slip yoke 42. In other words, the distance between the side surfaces 75 of each arm is approximately the same as the outer diameter of the body 43. This structure allows greater rotation (more flex angle) of the cross member 64 connected to the openings 61 of the slip yoke 42. As a result, the drive shaft assembly 10 has greater flexibility and improved performance.

Figure 4:
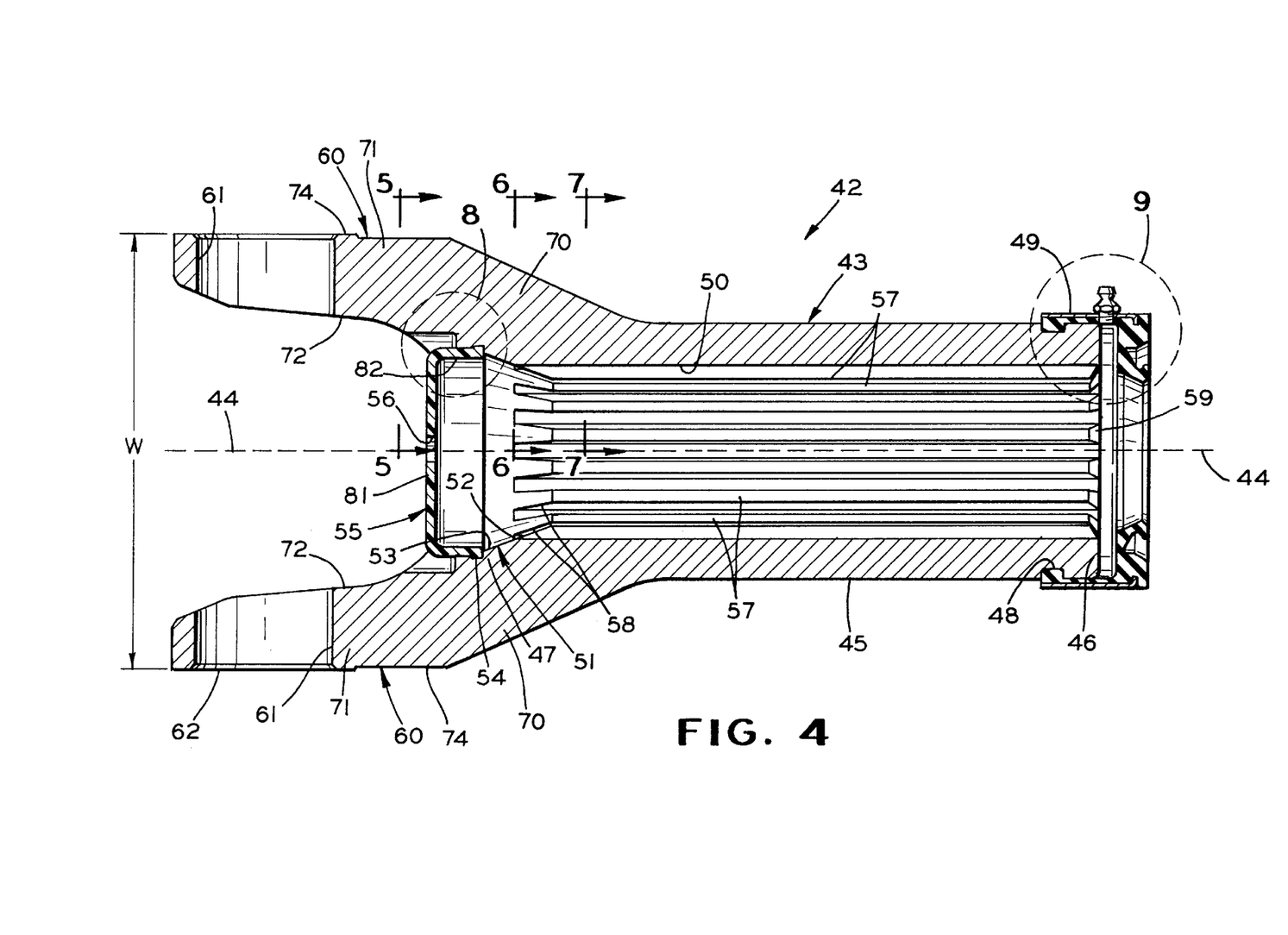
FIG. 4 is a cross-sectional view of the slip yoke also showing a dust cap and a seal.
Figure 8:
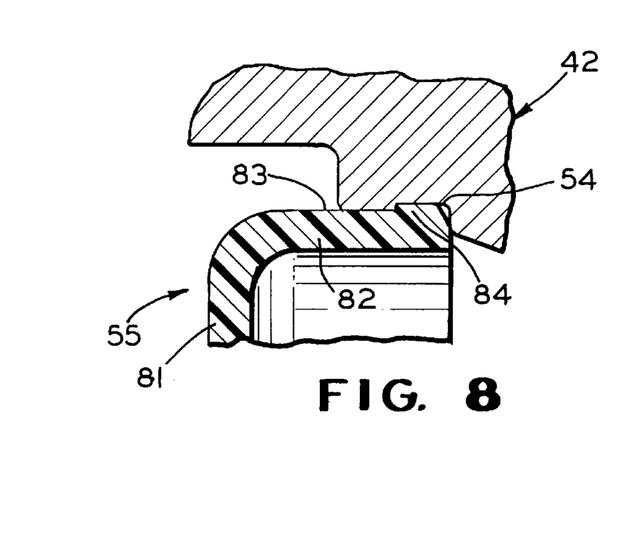
FIG. 8 is an enlarged sectional view of a portion of the dust cap and slip yoke of FIG. 4.

Referring now to FIGS. 4 and 8, the dust cap 55 mentioned above will be described in more detail. Preferably the dust cap 55 is formed from a hard, flexible material such as plastic. The dust cap 55 is generally shaped as a shallow cup. It includes a generally circular end portion 81. A generally circular aperture 56 for venting air is formed in the end portion 81. The dust cap 55 further includes a generally cylindrical skirt portion 82 including an outer cylindrical surface 83. A generally annular protrusion 84 is formed on the outer cylindrical surface 83 opposite the end portion 81. The outer diameter of the protrusion 84 of the dust cap 55 is slightly greater than the inner diameter of the groove 54 formed in the slip yoke 42. Thus, the protrusion 84 of the dust cap 55 is adapted to fit securely into the groove 54 of the slip yoke 42. The dust cap 55 can be easily snapped into place on the slip yoke 42. This snap-together structure provides cost and ease of use advantages over a previous structure including a screw-on dust cap.

Figure 9:
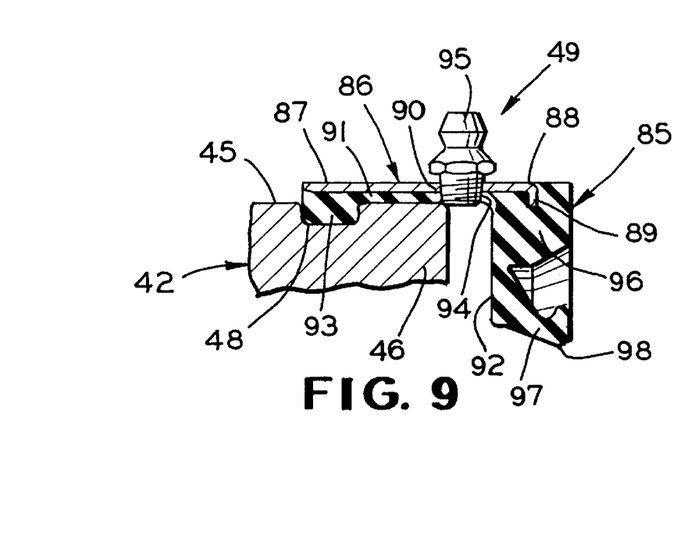
FIG. 9 is an enlarged sectional view of the seal and a portion of the slip yoke of FIG. 4.

The seal 49 mentioned briefly above will now be described in more detail. Referring to FIGS. 4 and 9, the seal 49 is generally annular in shape. It includes a resilient member 85, and a rigid member 86 that supports the resilient member 85. The rigid member 86 is generally cylindrical in shape, and it is coaxial with the body 43 of the slip yoke 42. The diameter of the rigid member 86 of the seal is somewhat greater than the diameter of the outer cylindrical surface 45 of the slip yoke 42. Thus, a first portion 87 of the seal 49 can extend around the body 43 of the slip yoke 42 at the shaft end 46, while a second portion 88 of the seal 49 is disposed adjacent to the shaft end 46. The rigid member 86 includes a radially inwardly extending flange 89 in the second portion 88 of the seal 49. The flange 89 helps to hold the resilient member 85 in place. A threaded aperture 90 is formed in the rigid member 86 immediately adjacent the shaft end 46 of the slip yoke 42. The rigid member 86 of the seal 49 is preferably formed from a metallic material such as steel.

The seal 49 further includes the resilient member 85 that is preferably formed from rubber or a similar material. The resilient member 85 includes an axially extending leg 91 and a radially inwardly extending leg 92. The axially extending leg 91 is generally cylindrical in shape. It is disposed between the rigid member 86 of the seal 49 and the outer cylindrical surface 45 of the slip yoke 42. The axially extending leg 91 includes a generally annular protrusion 93 formed on the end thereof, and extending radially inwardly. The protrusion 93 is adapted to fit securely into the groove 48 in the outer cylindrical surface 45 of the slip yoke 42. As a result of this structure, the seal 49 can be easily snapped into place on the slip yoke 42. This snap-together structure provides cost and ease of use advantages over a previous structure including a screw-on seal. A threaded aperture 94 is formed in the axially extending leg 91 of the resilient member 85 immediately adjacent the shaft end 46 of the slip yoke 42. The threaded aperture 94 of the resilient member 85 is aligned with the threaded aperture 90 of the rigid member 86. A threaded lubricant fitting 95 is secured within the aligned threaded apertures 90 and 94.

As shown in FIG. 1, the radially inwardly extending leg 92 of the resilient member 85 is adapted to engage the generally cylindrical body 32 of the stub shaft 31 and thereby provide a seal. Preferably the radially inwardly extending leg 92 includes a base portion 96 and a flexible lip portion 97 extending therefrom. The flexible lip portion 97 can accommodate some radial movement of the stub shaft 31 relative to the slip yoke 42. Preferably the flexible lip portion 97 engages the stub shaft 31 at a single location 98. The seal provided by the resilient member 85 is maintained when the stub shaft 31 slides axially within the slip yoke 42 during operation of the vehicle. The seal 49 retains lubricant between the stub shaft 31 and the slip yoke 42, and it keeps out contaminants such as dirt and water.

The slip yoke in accordance with this invention is preferably formed by a lost foam casting method. In this method, a foam pattern of the slip yoke is produced by blowing pre-expanded polystyrene foam beads into an aluminum mold of the slip yoke. The pattern has a configuration substantially identical to the finished slip yoke. Preferably twelve of such patterns are used in a single manufacturing operation. The patterns are assembled by attachment to a runner. Preferably, the patterns are then coated with an encapsulating film such as a ceramic glazing material known as a refractory wash. This material is applied as a liquid and dries to form a film on the polystyrene foam. The pattern assembly is then positioned inside a large flask. A flowable medium such as unbonded sand is poured into the flask and compacted around the patterns. The film prevents the sand from entering the interstices of the polystyrene foam. A molten metal such as steel is then introduced via a sprue to each of the patterns. The heat of the molten metal vaporizes the foam of the patterns. The vapor is entrapped within the interstices of the sand, while the molten metal occupies the voids created by vaporization of the patterns. The result is a cast metal part having a configuration substantially identical to the foam pattern. The accuracy of the casting is such that the bore, counterbore and apertures are cast to the desired size without requiring machining Advantageously, the lost foam method forms a slip yoke having an outer surface that is softer than the surface produced by a conventional casting method. Thus, balance weights can be directly welded onto the outer surface of the slip yoke without machining the outer surface.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:
1. A slip yoke comprising:
   a hollow body having a bore formed therethrough defining an inner cylindrical surface and having a counterbore formed at one end therein defining an inner frusto-conical surface contiguous with said inner cylindrical surface, said inner frusto-conical surface extending from a smaller diameter end that is connected to said bore to a larger diameter, said bore further includes a stepped region adjacent to said larger diameter end of said counterbore;
   a plurality of splines formed on a portion of said inner cylindrical surface, and a pair of yoke arms extending from said one end of said body and having aligned openings formed therethrough.

2. The slip yoke defined in claim 1 wherein said splines extend into a portion of said frusto-conical surface.

3. The slip yoke defined in claim 1 wherein each of said yoke arms has a recessed area formed therein that defines a pair of outer webs extending between said body and said openings.

4. The slip yoke defined in claim 3 wherein each of said yoke arms further includes a middle web extending through said recessed area between said body and said openings.

5. The slip yoke defined in claim 1 further including a dust cap secured to said body adjacent to said frusto-conical surface.

6. The slip yoke defined in claim 1 further including a seal secured to said body adjacent to said inner cylindrical surface.

7. A vehicular driveshaft assembly comprising:

a first universal joint;

a slip yoke connected to said first universal joint and including a hollow body having a bore formed therethrough defining an inner cylindrical surface and having a counterbore formed at one end therein defining an inner frusto-conical surface contiguous with said inner cylindrical surface, said inner frusto-conical surface extending from a smaller diameter end that is connected to said bore to a larger diameter end, said bore further including a stepped region adjacent to said larger diameter end of said counterbore, a plurality of splines formed on a portion of said inner cylindrical surface, and a pair of yoke arms extending from said one end of said body and having aligned openings formed therethrough;

a driveshaft tube connected to said slip yoke for rotational movement therewith; and a second universal joint connected to said driveshaft tube.

8. The vehicular driveshaft assembly defined in claim 7 wherein said splines extend into a portion of said frusto-conical surface.

9. The vehicular driveshaft assembly defined in claim 7 wherein each of said yoke arms has a recessed area formed therein that defines a pair of outer webs extending between said body and said openings.

10. The vehicular driveshaft assembly defined in claim 9 wherein each of said yoke arms further includes a middle web extending through said recessed area between said body and said openings.

11. The vehicular driveshaft assembly defined in claim 7 further including a dust cap secured to said body adjacent to said frusto-conical surface.

12. The vehicular driveshaft assembly defined in claim 7 further including a seal secured to said body adjacent to said inner cylindrical surface.

13. The vehicular driveshaft assembly defined in claim 7 wherein said driveshaft tube is connected to said slip yoke for axial movement relative thereto.

* * * * *